United States Patent [19]

Dankert

[11] Patent Number: 4,939,329

[45] Date of Patent: Jul. 3, 1990

[54] ROLLER ACTIVATED SWITCH

[76] Inventor: Norman H. Dankert, 221 Decatur St., Michigan City, Ind.

[21] Appl. No.: 355,287

[22] Filed: May 22, 1989

Related U.S. Application Data

[62] Division of Ser. No. 28,677, Mar. 20, 1987.

[51] Int. Cl.$^5$ ............................................. H01H 3/42
[52] U.S. Cl. ...................................... 200/573; 200/456;
200/432; 200/436; 200/542; 200/538; 200/331
[58] Field of Search ............... 200/405, 410, 411, 412,
200/413, 416, 417, 418, 446, 431, 434, 435, 436,
437, 438, 439, 453, 454, 456, 459, 460, 461, 537,
538, 542, 543, 545, 546, 573, 330, 331, 337, 338,
432, 455

[56] References Cited

U.S. PATENT DOCUMENTS

| | | | |
|---|---|---|---|
| 2,521,277 | 9/1950 | Aubert | 200/456 X |
| 2,927,171 | 3/1960 | Rhodes | 200/456 |
| 2,982,944 | 5/1961 | Weller | 340/467 |
| 3,098,903 | 7/1963 | Anderson | 200/461 |
| 3,192,349 | 6/1965 | Horberg, Jr. | 200/573 |
| 3,221,130 | 11/1965 | Scozzatava | 200/432 |
| 3,336,450 | 2/1966 | Rainer | 200/61.89 |
| 3,414,879 | 7/1965 | Holland | 340/71 |
| 3,439,138 | 4/1969 | Braun | 200/438 |
| 3,546,529 | 2/1967 | Garrison | 340/72 |
| 3,569,655 | 3/1971 | Jakubauskas | 200/337 X |
| 3,806,870 | 4/1974 | Kalajian | 340/71 |
| 3,881,078 | 1/1974 | Kazanecki | 200/61.89 |
| 3,921,750 | 6/1974 | Shames | 180/200 |
| 3,937,912 | 2/1976 | Martin | 200/573 X |
| 4,107,647 | 4/1976 | Yoshino | 340/71 |
| 4,115,671 | 12/1976 | Iijima | 200/61.91 |
| 4,224,598 | 9/1980 | Ostrowski | 340/66 |
| 4,540,859 | 9/1985 | Lemmer | 200/573 X |
| 4,594,574 | 6/1976 | Therman | 340/467 |

FOREIGN PATENT DOCUMENTS

| | | | |
|---|---|---|---|
| 2203959 | 8/1973 | Fed. Rep. of Germany | 200/412 |
| 1022319 | 3/1953 | France | 200/432 |
| 0587516 | 1/1978 | U.S.S.R. | 200/573 |

Primary Examiner—Ernest G. Cusick

[57] ABSTRACT

A roller activated switch with an unlimited number of triggering points, a preferred embodiment featuring linear activation by a rod upon the roller. The switch unit receives a moveable member upon the roller in its housing. The moveable member rolls a spring-biased roller to an off center position, thus activating or deactivating contacts upon any movement of the moveable member beyond a small increment. The switch rapidly responds to any reversing movement of the moveable member upon the roller no matter what absolute position the moveable member is in, at the time, thus having an unlimited number of changeable triggering points independent of contact pressure and having an overtravel limited only by the length of the moveable member. This feature results in the switch having the ability to establish its own triggering points. Thus, absolute triggering becomes automatic.

4 Claims, 2 Drawing Sheets

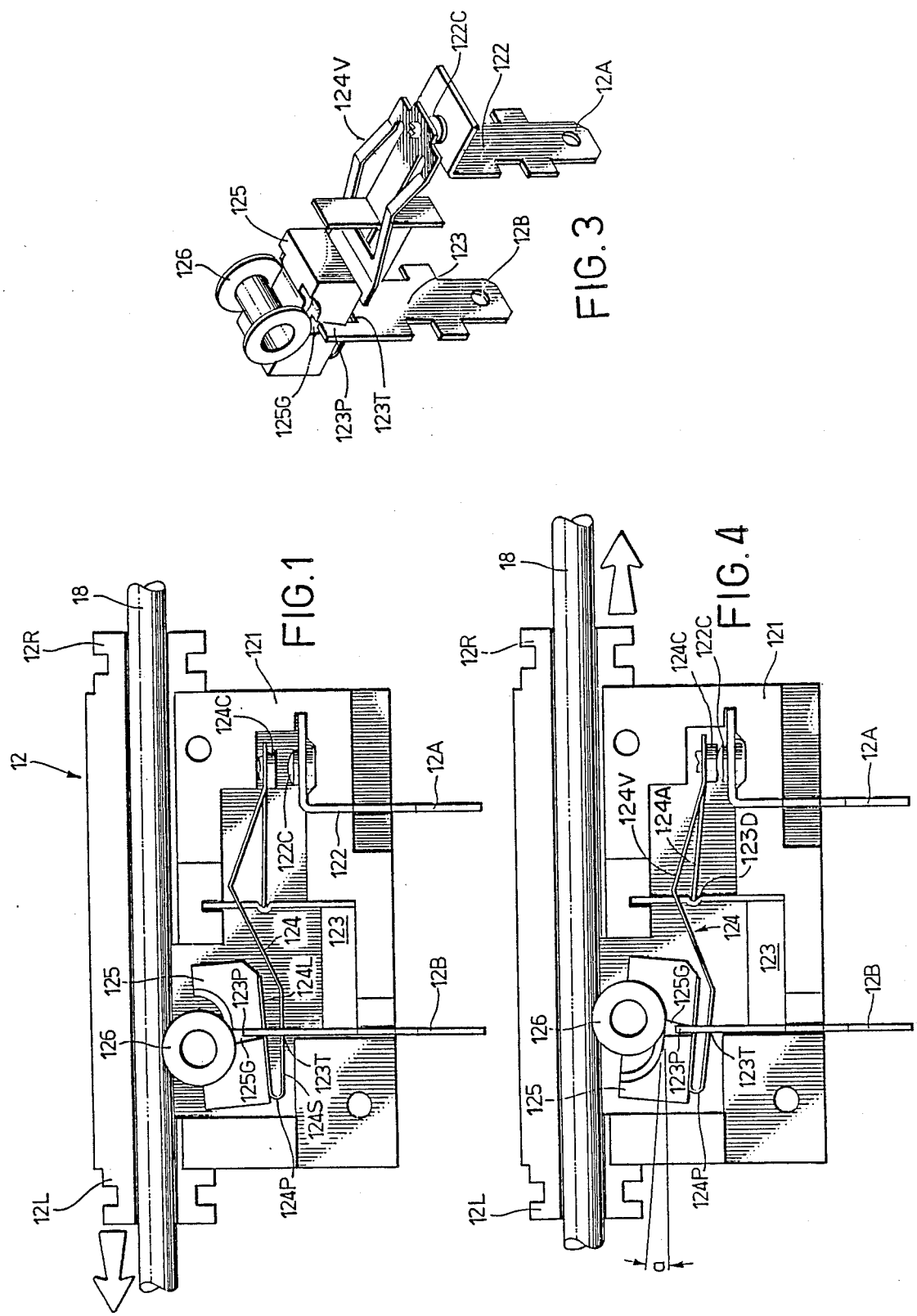

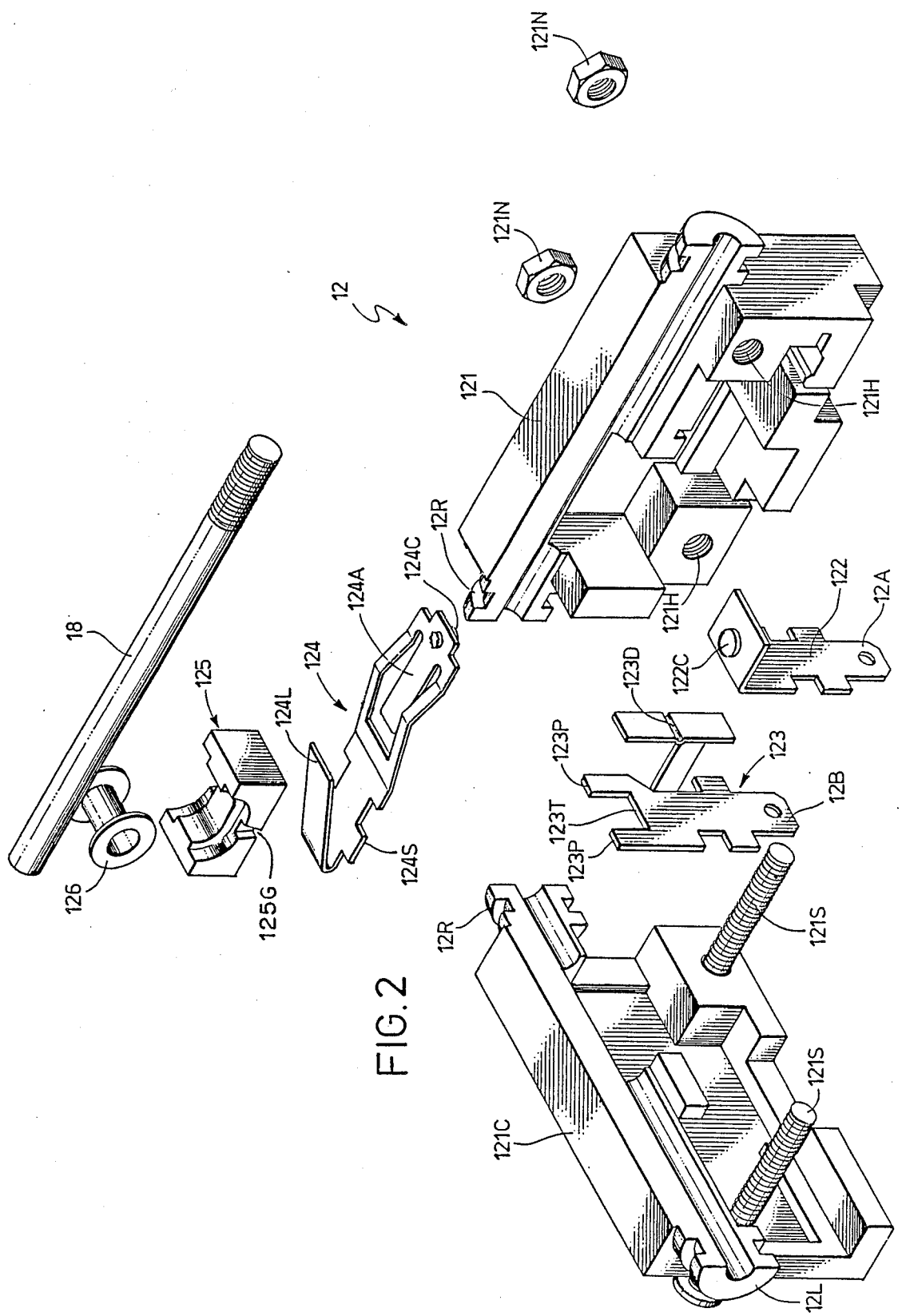

ROLLER ACTIVATED SWITCH

This application is a divison of my copending application Ser. No. 028,677, fielded Mar. 20, 1987, and entitled Automobile Warning Light Improvement.

FIELD OF THE INVENTION

This invention relates to electrical switch actuation, where a moveable member is movable in a defined path through its housing, which determines its diameter; and where the moveable member can be of any length and is moved by a constant, low operating force, independent of contact pressure; and where the movable member's point of reversal will displace a roller that triggers the independent moving contact.

BACKGROUND OF THE INVENTION

The plunger activation in snap action switches has limitations. The set operating position of these switches may vary through manufacture. This makes the end use a problem of selection. The configurations for flexible activation of these switches requires special mounting and maintenance procedures. These problems arise by having a set operating position and a fixed limit position on overtravel.

SUMMARY OF THE INVENTION

Therefore, the present invention is proposed to eliminate such problems. It is the object of this invention to provide an electrical switch with unlimited operating positions with no fixed limit position or overtravel.

It is another object of this invention to have contact operation isolated from the rod movement. It is these above mentioned features that allow the design of its switch housing to offer greater flexibility in mounting and maintenance.

Regarding this approach, the following references are cited in U.S. Pat. Nos. 3,336,575; 3,576,529; 3,881,078; 3,921,750; 4,107,647; 4,115,671; 4,504,712.

The invention, together with the advantages thereof, may best be understood by reference to the following description, taken in connection with the accompanying drawings, in the several figures of which like reference numerals identify like elements.

BRIEF DESCRIPTION OF THE DRAWINGS

FIG. 1 is an elevational view of the roller activated switch unit [of FIGS. 1-4] with its cover removed, which in this preferred embodiment employs a linear rod for activation.

FIG. 2 is an exploded perspective view of the switch unit of FIG. 1.

FIG. 3 is a perspective assembled view of the operational interior of the switch of FIGS. 1 and 2.

FIG. 4 is an elevational view similar to that of FIG. 1 of the switch unit with parts in moved positions.

DETAILED DESCRIPTION OF THE SWITCH

The internal construction and operation of the unit 12 is best seen in FIGS. 1-4. Referring to those Figures and initially to FIG. 1, the switch unit 12 includes a main housing 121 of non-conductive material, such as diallyl pythalate—a method phenolic with a TV—5 rating for fire protection. A cover 121C (FIG. 2) of the same material is provided. Within this housing 121 are received a first terminal and contact metal unit 122 (which projects outside of the housing 121 to form the connecting terminal 12A), a second terminal and pivot member 123 which forms the input 12B, a metal "teeter-totter" contact member 124, a saddle member 125, a roller member 126, and the rod 18.

The construction of these parts and of the housing cover 121C and its connecting screws 121S is shown better in the exploded view of FIG. 2. The housing 121 is secured together by a pair of machine screws 121S which pass through smooth bores in the cover 121C and are received in threaded holes 121H in the main housing 121. These screws 121S preferably are longer than needed to only just secure the cover 121C to the housing 121 so they may extend out of the rear of the housing 121. A pair of nuts 121N are provided which can be threaded onto the projecting threaded ends of the screws 121S when the switch unit 12 is assembled. These nuts 121N may serve to secure the bracket 120 to the rear of the housing 121. The roller or wheel member 126 has a curvature which receives the outer surface of the rod 18 in a friction contact. The roller member 126 sits in the saddle member 125 and can roll a short distance in it from left to right as the rod 18 moves left or right. When it reaches either end of its range of positions, and the rod continues to move in that direction, the roller 126 spins in the saddle and/or allows the rod to continue to slip or slide by it for as long as the rod continues to travel in that one direction.

The saddle member 125 rests on a leaf spring 124L which supports the saddle 125 and urges it upward. The entire "Teetor-totter" member 124 rests against and pivots on a cross bar 123T between a pair of vertical posts 123P and the top of the bar 123T which becomes the fulcrum for the member 124. The posts 123P are loosely received in grooves 125G in the sides of the saddle 125, allowing the saddle 125 to rock and travel up and down a short distance.

The surface which the roller 126 travels on is slanted a slight angle "a", as indicated in FIG. 4. That is, relative to its base, the left side (see FIGS. 1 and 4) of the saddle 125 is slightly higher than the right side. In one working protype, this angle was six degrees. Thus, the left side of the saddle 125 is pushed down as the roller 126 rolls from the position shown in FIG. 4 to that of FIG. 1 to produce a locking effect in that position.

This, plus the geometry of the saddle, causes the pivot 124P to move downward, causing the member 124 to pivot about the fulcrum 123T and raise the contact 124C of member 124 off of the contact 122C of the member 122 to break the electrical circuit from contact (via members 123 and 124) to contact 12B and 12A (via member 122).

The unit 124 is formed of spring metal and thus the section 124L serves as a leaf spring to bias the saddle 125 and the roller 126 upward into contact with the rod 18. The relaxed position of this spring is preferably above its (as shown in FIG. 4) operating positions when assembled, so as to always urge the saddle and roller upward.

The elasticity of the spring metal is such, however, that when the leaf 124L is pivoted downward approximately parallel to that of the section including part 124S (as shown in FIG. 4), the leaf essentially ceases to pivot about the area 124P and instead becomes as an inelastic member to further downward forces. Thus, the saddle 125 as it assumes the position of FIG. 4 rocks both the section 124L and the portion over the fulcrum 123T to "snap" the contact 124C downward.

As also best seen in FIG. 4, the member 124 is formed with a pair of side arms 124V which serve to spring bias rearward the contact 124C area and to urge the arm 124A into its groove 123D. The geometry of the groove 123D and arm 124A as shown in FIGS. 1 and 4, is such as to spring bias the contact 124C downward so that a good pressing contact is achieved against the contact 12[1]2C.

Reversal of the direction of travel of the rod 18 causes the roller 126 to move to the right (as viewed in FIGS. 1 and 4). In the process, member 124 will rock (pivot) between the pair of guide posts 123P formed by vertical extensions of member 123. This closes contact 124c with 122C which is the natural position established by the blade of member 124. The tension of 124 will result as a snap action of the contacts. These contacts 122C and 124C remain in contact as long as the rod 18 is stationary or moves to the right, as seen in FIG. 4. However, when the rod 18 reverses direction sufficiently to roll the roller 126 to the left, it opens the contacts 122C-124C and returns the switch 12 to the open condition shown in FIG. 1.

This means that a small movement in one direction will cause the linear switch to close its contacts, if open, and a small motion in the opposite direction causes the contacts to open, if closed.

The use for this switch is not restricted to this one application but can have application anywhere microswitches are used and many other applications beyond these, e.g., sump pump control, garage door openers, etc.

Also, there is no normally open or closed position of the rod 18 with this switch, and the operating point is determined by the last position of the linear rod. And only a low activating pressure is required to obtain a relatively high amperage; unlike other switches, there is no relation between (rod) pressure and amperage.

A protype of this [unique] switch unit 12 has been constructed and tested and proven to function as desired. A presently preferred embodiment of the switch would have a housing 121 [- 121C] of about 1½ inches by 1 inch by ½ inch (exclusive of the sleeve proportions 12L and 12R).

The blade 124 is preferably formed of about .006 sheet Beryllium copper spring metal with a contact 124C of silver cadium oxide (⅛ by 1/32 inches in size). The overall size of formed member 124 is preferable about 0.1115 inch wide by ½ inch in overall length including the portion to which the contact 124C is secured.

The terminal units 122, 123 are preferably made of sheet tin plate 0.025 inch thick with the unit 122 made to be about 5/6 inch wide by 11/16 inch high, with the contact receiving area about 5/16 inch [by 5/6 inch work in area ]. The material and size of the contact 122C is preferably similar to that of the contact 124C. The terminal member is preferably about one inch by 0.425 inch by 0.425 inch by 5/16 inch, with an overall size with the dent 123D formed about 3/16 inch from its top and fulcrum 123T formed about ½ inch from the top. The posts 123P project upward about ⅛ inch from 123T and are spaced apart by about 3/16 inch.

The saddle 125 is preferably about 7/16 inch by 7/32 inch by 3/16 inch in overall size with post-receiving side slots of approximately 1/32 inch deep and approximately 0.028 inch wide at the bottom and opening up to about 0.044 inch. 3/32 inch above the base, there is an opening with ruts that receive the roller member 126. These ruts are approximately 1/16 inch wide. The roller 126 is preferably sized to fit this saddle.

The above specific values, of course, exemplary and may be varied broadly. They are set out here only to add definiteness to the disclosure and not to limit the invention nor the scope of the claims.

While particular embodiments of the invention have been shown and described, it will be obvious to those skilled in the art that changes and modifications may be made without departing from the invention, and, therefore, the aim in the appended claims is to cover all such changes and modifications as fall within the true spirit and scope of the invention.

For example, the switch unit 12, instead of having a single fixed contact 122C, might include a second fixed contact at the upper position of travel for the contact 124C (which could be made to mate with fixed contacts) and a terminal connected thereto so as to close this alternative circuit from terminal 12B after opening the circuit to terminal 12A.

I claim:

1. A switch unit with an independent, triggering actuator, comprising:
 a housing with means to receive and locate switch components;
 an actuating member, mounted in said housing, said actuating member reciprocating in opposite directions along a defined path through said housing said actuating member being reciprocated from the exterior of said housing;
 said housing composed of non-conducting material;
 a pair of conductive terminal members mounted in said housing with electric terminals which project from within the housing to the exterior of the housing;
 an electrical contact means located inside said housing, for opening and closing an electrical conduction path between said pair of terminal members;
 a fulcrum point defined by said pair of conductive terminal members;
 a roller member mounted within said housing including means for contacting said actuating member; said roller member being mounted for movement between a first and second position; said first position located below said fulcrum point;
 a pivoting member mounted in the housing on said fulcrum point so as to pivot;
 said pivoting member rotatably receiving said roller member and limiting the first and second positions; said pivoting member being pivoted in response to said movement of said roller member; and
 whereby upon movement of said actuating member in one direction causes the roller member to pivot the pivoting member over said fulcrum point and allow the roller to move from said first position to said second position; continued reciprocating movement of said actuating member in said one direction, to any extend, will maintain the roller member in said second position;
 wherein movement of said actuating member, in said other direction, from any extent said actuating member has finally rested in after movement in said one direction, will cause said roller member to move from said second position to said first position while pivoting said pivoting member over said fulcrum point, said movement in said other direction of said actuating member needing only to be relatively short to cause said roller member to move from said second position to said first position, continued movement of said actuating member in said other direction permitting the roller member to freely rotate in said first position;

said contact means being responsive to movement of said roller member between said first and second positions for opening and closing said conduction path.

2. The switch unit of claim 1, wherein said electrical contact means includes a self-biased snap action blade electrically connected at one end to one of said pair of terminal members, the other end of said blade comprising a movable contact end which is movable into and out of contact with the other of said pair of terminal members for opening or closing said conduction path.

3. The switch unit of claim 2, wherein said one end of said blade includes a biasing portion which is in contact with said pivoting member so as to bias the pivoting member against the roller member and consequentially biasing the roller member against the actuating member, wherein the roller member is frictionally engaged with said actuating member as a result of the biasing portion.

4. The switch unit of claim 3, wherein said blade is pivoted on said fulcrum point and said blade, as a result of its self-biased nature, when closing said conduction path is urged against the other terminal of said pair of terminals.

* * * * *